United States Patent
Pollard et al.

(10) Patent No.: US 10,654,583 B2
(45) Date of Patent: May 19, 2020

(54) FUEL TANK INERTING SYSTEM AND METHOD

(71) Applicant: HS Marston Aerospace Limited, Wolverhampton (GB)

(72) Inventors: Berwyn Pollard, Wolverhampton (GB); Paul Phillips, Bromsgrove (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 0 days.

(21) Appl. No.: 16/007,009

(22) Filed: Jun. 13, 2018

(65) Prior Publication Data
US 2018/0354643 A1  Dec. 13, 2018

(30) Foreign Application Priority Data

Jun. 13, 2017 (EP) ..................... 17175696

(51) Int. Cl.
| | | |
|---|---|---|
| *F28F 27/02* | (2006.01) | |
| *B64D 37/32* | (2006.01) | |
| *B01D 53/86* | (2006.01) | |
| *B64D 37/34* | (2006.01) | |

(52) U.S. Cl.
CPC ......... *B64D 37/32* (2013.01); *B01D 53/8671* (2013.01); *B01D 53/8696* (2013.01); *B64D 37/34* (2013.01); *F28F 27/02* (2013.01)

(58) Field of Classification Search
None
See application file for complete search history.

(56) References Cited

U.S. PATENT DOCUMENTS

| | | |
|---|---|---|
| 3,847,298 A | 11/1974 | Hamilton |
| 7,694,916 B2 | 4/2010 | Limaye et al. |
| 7,735,670 B2 | 6/2010 | Zaki et al. |
| 7,896,292 B2 | 3/2011 | Limaye et al. |
| 7,905,259 B2 | 3/2011 | Johnson et al. |
| 8,602,362 B2 | 12/2013 | Buchwald |
| 8,828,344 B2 | 9/2014 | K-Wlam et al. |

(Continued)

FOREIGN PATENT DOCUMENTS

| | | |
|---|---|---|
| EP | 2439141 A2 | 4/2012 |
| GB | 1395691 | 5/1975 |

OTHER PUBLICATIONS

Extended European Search Report for International Application No. 17175696.8 dated Dec. 21, 2017, 5 pages.

*Primary Examiner* — Anita Nassiri-Motlagh
(74) *Attorney, Agent, or Firm* — Cantor Colburn LLP

(57) ABSTRACT

A fuel tank inerting system for an aircraft, the system comprising: a fuel tank, and a catalytic heat exchanger. The catalytic heat exchanger comprises a first flow path and a second flow path for heat exchange with the first flow path, as well as a first inlet arranged upstream of the first flow path of the catalytic heat exchanger for providing a mixture of fuel vapour and oxygen to the first flow path for sustaining a catalysed reaction, and a second inlet arranged upstream of the second flow path for providing a flow of fuel from the fuel tank to the second flow path of the catalytic heat exchanger for exchanging heat with the first flow path. The system further comprises a transfer pipe in heat exchange with the fuel tank, wherein the transfer pipe is arranged to receive fuel from the second flow path of the catalytic heat exchanger.

9 Claims, 2 Drawing Sheets

(56) References Cited

U.S. PATENT DOCUMENTS

| | | | |
|---|---|---|---|
| 2008/0199376 A1 | 8/2008 | Limaye et al. | |
| 2009/0258259 A1* | 10/2009 | Leshchiner | C01B 3/16 |
| | | | 429/423 |
| 2010/0139627 A1* | 6/2010 | Verhein | F02D 19/0605 |
| | | | 123/553 |

* cited by examiner

FUEL TANK INERTING SYSTEM AND METHOD

FOREIGN PRIORITY

This application claims priority to European Patent Application No. 17175696.8 filed Jun. 13, 2017, the entire contents of which is incorporated herein by reference.

TECHNICAL FIELD

The invention relates to a fuel tank inerting system for an aircraft, particularly to a fuel tank inerting system comprising a catalytic heat converter and a fuel tank.

BACKGROUND

Fuel tank inerting systems (also called flammability reduction systems) are used on most commercial aircraft. They are used to provide an inert atmosphere to the ullage or header of a fuel tank in order to reduce the risk of fuel combustion and explosion. Typically they employ air separation membrane technology. However, such known systems degrade over time and require significant levels of costly maintenance.

An alternative system is a catalyst based fuel tank inerting system, where bleed-air-fed air separation modules and filter elements are replaced by a catalyst. Such a system requires fuel vapour to be mixed with oxygen and passed through a catalyst device to be converted into carbon dioxide ($CO_2$) and water ($H_2O$). Due to significant temperatures that are generated during the catalyst's exothermic reaction the catalyst needs to be cooled. Hence the catalyst may be provided as a coating inside a heat exchanger. The heat exchanger may be cooled by e.g. ram air.

However, in use such heat exchangers face issues because different amounts of cooling are available during different stages of flight. For example, operating conditions on the ground are different to those at cruise. Ram air at cruise can have a temperature of −40° F. (−40° C.), whereas on the ground in hot climates it can have a temperature as much as +130° F. (50° C.). The catalysed reaction of fuel and oxygen in the heat exchanger must be kept at a minimum of 350° F. (180° C.) in order to keep the catalyst 'lit' (i.e. reacting) and the catalysed reaction active. A heat exchanger sized so that it achieves a maximum temperature of 425° F. (220° C.) on the ground will produce warmed ram air of 1600° F. (870° C.) during cruise, far in excess of the necessary temperatures. Making a heat exchanger small in order to avoid such high cruise temperatures results in too high ground temperatures. Thus, it is necessary to compromise and use a heat exchanger that is non-optimal for all conditions.

SUMMARY

According to a first aspect of the present invention there is provided a fuel tank inerting system for an aircraft, the system comprising: a fuel tank; a catalytic heat exchanger comprising a first flow path and a second flow path for heat exchange with the first flow path; a first inlet arranged upstream of the first flow path of the catalytic heat exchanger for providing a mixture of fuel vapour and oxygen to the first flow path for sustaining a catalysed reaction; a second inlet arranged upstream of the second flow path for providing a flow of fuel from the fuel tank to the second flow path of the catalytic heat exchanger for exchanging heat with the first flow path; a transfer pipe in heat exchange with the fuel tank, wherein the transfer pipe is arranged to receive fuel from the second flow path of the catalytic heat exchanger.

Thus, the system is arranged such that during use (e.g. flight) fuel passes from the second inlet into the second flow path and exchanges heat with the first flow path to maintain the temperature of the catalysed reaction of fuel vapour and oxygen at or near a predetermined temperature. Fuel may be less susceptible to variations in temperature than is air. The fuel supplied to the second flow path may have a consistent temperature. Hence better control over the temperature of the heat exchanger may be provided.

The catalytic heat exchanger comprises a catalyst in the first flow path for catalysing a reaction of fuel vapour and oxygen. The reaction may create water and carbon dioxide. Fuel vapour may be mixed with oxygen rich air upstream of the first flow path and supplied to the first flow path at a desired rate and in a desired ratio so as to sustain the catalytic reaction as required. The catalyst may be provided as a coating on the interior of the first flow path, or may be provided in any suitable way to catalyse the reaction of fuel and oxygen passing through the first flow path.

The output of the catalysed reaction and the catalytic heat exchanger may be substantially a mixture of water and carbon dioxide and may be supplied to the ullage of a fuel tank in order to provide an inert atmosphere therein to reduce the risk of combustion or explosion of the fuel. Water exiting the catalytic heat exchanger may be in a gas phase and may be supplied to a condenser to condense it to liquid. The water may then be separated from the carbon dioxide by any suitable means. The system may be arranged so that only carbon dioxide is supplied in to the fuel tank from the catalytic heat exchanger. By supplying carbon dioxide and hence maintaining a positive pressure in the fuel tank, the system may further serve to help prevent ingress of water into the fuel tank from outside sources. Ingress of water into a fuel system may lead to an increased risk of ice formation in the fuel during cold conditions and/or high altitude operation. The first and second inlets may be part of the catalytic heat exchanger. During use, fuel exiting the second flow path may be provided to the first inlet so that it then undergoes the catalysed reaction. The second flow path may be arranged to provide fuel to the first flow path.

The transfer pipe is arranged to receive fuel that has been heated in the second flow path and supply that heated fuel into heat exchanger with the fuel in the fuel tank so as to heat the fuel in the fuel tank. The effect on the temperature of the fuel in the fuel tank may be such that the heat from the fuel in the transfer pipe does not raise the temperature of the fuel in the fuel tank by more than a few degrees. However, it may be sufficient to help prevent fuel icing issues.

The system may comprise a fuel conditioner upstream of the second inlet for controlling the temperature of the fuel entering the second flow path of the catalytic heat exchanger. The fuel conditioner may be fuel/oil cooler. Thus, temperature controlled fuel (i.e. fuel with a temperature that has been influenced to predetermined extent) may be supplied to the second flow path of the catalytic heat exchanger, and consequently the temperature of the heat exchanger—and hence the temperature of the catalyst and catalytic reaction—may be controlled (e.g. influenced, maintained, increased or reduced).

The fuel conditioner may be arranged to receive fuel from a fuel tank and to condition the fuel to a desired temperature by bringing it into heat exchange with a flow of oil. The fuel entering the fuel conditioner may be colder than needed, and the fuel conditioner may be arranged to heat the fuel passing therethrough to a predetermined temperature before being supplied to the catalytic heat exchanger. The catalytic reaction may be exothermic and may need to be cooled by the fuel in the second flow path. Thus, the fuel conditioner may heat the fuel prior to supplying it to the second flow path but may be arranged not to heat the fuel to a temperature greater than that of the catalytic reaction, so that the catalytic reaction may always be cooled by the fuel in the second flow path.

The system may comprise a temperature controlled valve upstream of the second inlet for controlling the rate of flow of fuel to the second inlet. Where a fuel conditioner is included in the system, the temperature controlled valve may be downstream thereof and arranged to receive fuel therefrom. Hence the temperature controlled valve may be disposed between the fuel conditioner and the second flow path and may control the flow of fuel therebetween.

The temperature controlled valve may be arranged to divert fuel so as to bypass the catalytic heat exchanger. The temperature controlled valve may be controlled based on the temperature of the catalytic reaction or the heat exchanger. The temperature controlled valve may therefore control the rate of fuel flow into the second flow path of the catalytic heat exchanger in order to control the temperature thereof. The system may comprise a bypass line arranged to receive fuel from the temperature controlled valve to bypass the heat exchanger and may combine bypassed fuel with fuel exiting the second flow path. The temperature controlled valve may be arranged to divert all or only a portion of the flow passing through it. The valve may be arranged so that it does not bypass any fuel. The valve may be an electromechanical valve.

The temperature controlled valve may be configured such that fuel is diverted to bypass the second flow path when the catalyst is less than a predetermined temperature. Diverting fuel in such a case reduces cooling of the catalyst. The valve may be configured to divert only a portion of the fuel when the catalyst is approximately at the predetermined temperature. In this case the temperature of the catalyst may be maintained. The valve may divert any necessary proportion of fuel to provide a range of control. The valve may be configured to not divert any fuel when the temperature of the catalyst is above the predetermined temperature, thereby increasing cooling of the catalyst.

The system may be arranged so that the temperature of the fuel exiting the fuel conditioner is adjustable and controllable. Thus, the temperature of the heat exchanger may be controlled by controlling the temperature of fuel entering the second flow path, as well as by diverting fuel to bypass the second flow path.

The system may be arranged so that in use fuel exiting the second flow path has been vaporised. The system may be arranged to vapourise any liquid fuel leaving the second flow path. The system may be arranged to supply fuel leaving the second flow path to the first inlet of catalytic heat exchanger. The system may comprise a heating element downstream of the second flow path for vapourising liquid fuel from the second flow path. The vapourised fuel may be combined with oxygen or oxygen rich air and supplied to the first flow path to undergo the catalysed reaction. Fuel leaving the second flow path will have been heated by cooling the catalytic reaction and hence will either already be vapourised, or will require less energy to vapourise.

The system may be arranged such that the fuel firstly passes through the second flow path to maintain the temperature of the catalyst, and then passes through the first flow path to undergo the catalysed reaction to maintain an inert temperature in the fuel tank.

The system may be arranged such that all fuel supplied to the first inlet of the catalytic heat exchanger in use will first have passed through the second flow path. Thus all fuel reaching the first inlet during use will have already passed through the catalytic heat exchanger via the second flow path. The system may be arranged such that no other fuel is supplied to the first flow path i.e. only fuel which has been through the second flow path is supplied to the first flow path.

The system may be arranged such that all fuel which passes through the second flow path is supplied to first flow path. When the system comprises a temperature controlled valve as described above, the system may be arranged so that all fuel which passes though the temperature controlled valve is supplied to the first flow path. The valve may be arranged so that it supplies all fuel passing therethrough to only the second flow path and the bypass.

The system may comprise a fuel tank and the fuel conditioner may be arranged in use to receive fuel from the fuel tank. Then, all fuel being used in the catalytic reaction may have come from the fuel tank via the fuel conditioner and the temperature controlled valve.

The transfer pipe may be arranged to supply fuel back to the secondary flow path. Thus, after fuel has exited the second flow path of the heat exchanger and has been placed in heat exchange with the fuel in the fuel tank, the system may return that fuel to the second flow path in order to cool the catalytic reaction. If a fuel conditioner in included, the transfer pipe may be arranged to supply fuel to the intake thereof before returning it is returned to the second flow path. Thus, the transfer pipe and second flow path may form part of a flow loop.

The system may comprise a valve downstream of the second flow path and upstream of the transfer pipe for apportioning flow between the transfer pipe and the first inlet of heat exchanger. The valve may be configured to control the flow of fuel based on a temperature of the catalyst and/or based on a temperature of fuel in the fuel tank. Thus fine control over the functioning of the fuel inerting system may be achieved. If an increased amount of cooling of the heat exchanger is needed such that a higher volume of fuel must be passed through the second flow path, but no corresponding increase in the amount of fuel vapour for the catalysed reaction is needed, then excess fuel may be directed to the transfer pipe as needed.

A portion of the transfer pipe may be disposed within the fuel tank, and a portion of the transfer pipe may be in direct contact with fuel in the fuel tank so that heat exchange between fuel in the transfer pipe and fuel in the fuel tank is improved.

According to a second aspect of the present invention there is provided a method of regulating temperature in a fuel inerting system for an aircraft, the system comprising: a fuel tank; a catalytic heat exchanger comprising a first flow path and a second flow path for heat exchange with the first flow path; a first inlet arranged upstream of the first flow path of the catalytic heat exchanger for providing a mixture of fuel vapour and oxygen to the first flow path for sustaining a catalysed reaction; and a second inlet arranged upstream of the second flow path for providing a flow of fuel from the fuel tank to the second flow path of the catalytic heat exchanger for exchanging heat with the first flow path; the method comprising transporting fuel from the second flow path of the catalytic heat exchanger to the fuel tank so as to exchange heat therewith.

Preferably a supply of water and carbon dioxide is provided to the ullage of the fuel tank to create an inert atmosphere therein for reducing the risk of combustion and/or explosion of fuel in the tank.

The method may comprise heating and/or cooling fuel before passing the temperature controlled fuel to the heat exchanger. The method may comprise using a fuel conditioner to control the temperature of the fuel prior to supply of that fuel to the second flow path of the catalytic heat exchanger so as to control the temperature of the catalyst in the heat exchanger.

The method may comprise using a temperature controlled valve to control the flow of temperature controlled fuel entering the heat exchanger. The method may comprise controlling the flow and rate of fuel entering the second flow path of the heat exchanger using the valve so as to control the temperature thereof.

The method may comprise diverting fuel to bypass the heat exchanger in order to control the rate of fuel supplied to the second flow path and hence control cooling of the heat exchanger. The method may further comprise recombining the diverted fuel with fuel exiting the second flow path.

The method may comprise diverting fuel when the temperature of the catalyst is below a predetermined temperature in order to reduce cooling thereof. The method may comprise diverting only a portion of fuel when the temperature of the catalyst is at or near the predetermined temperature in order to maintain a temperature of the catalyst. The method may comprise not diverting any fuel when the catalyst is above a predetermined temperature. Thus, the method may comprise controlling the temperature of the catalyst using a temperature controlled valve, and may comprise controlling the temperature controlled valve based on the temperature of the catalyst. The method may include maintaining the temperature of the catalyst by not diverting fuel, and/or may comprise maintaining the temperature of the catalyst by diverting fuel. The method may comprise diverting fuel as necessary to control the temperature of the catalyst.

The method may comprise controlling the temperature of the catalyst by controlling the temperature of the fuel entering the second flow path. The method may comprise controlling the temperature of the catalyst only by controlling the temperature of the fuel entering the second flow path. The method may comprise controlling the temperature of the fuel entering the second flow path and controlling the rate of flow of fuel entering the second flow path.

The method may comprise reacting in the catalytic reaction fuel that has been in heat exchange with the reaction. The method may comprise reacting in the catalytic reaction only fuel that has previously been in heat exchange with in the reaction. Thus, the method may comprise supplying fuel which has been heated in the second flow path to the first flow path.

If the system comprises a temperature controlled valve, the method may comprise supplying to the first flow path all fuel that has passed through the temperature controlled valve.

The method may comprise depositing fuel from the transfer pipe into the fuel tank. The method may instead comprise only placing the fuel in heat exchange with the fuel tank e.g. through a wall of the transfer pipe within the fuel tank. The interior of the transfer pipe may thus be isolated from that of the fuel tank.

The method may comprise supplying the fuel from the transfer pipe back to the second flow path of the catalytic heat exchanger after it has been in heat exchange with the fuel tank. When the fuel inerting system comprises a fuel conditioner the method may comprise supply fuel from the transfer pipe to an intake of the fuel conditioner before supply it to the second flow path.

All fuel supplied from the transfer pipe may be supplied to the second flow path, and may be supplied to the second flow path via the fuel conditioner where such is present.

The method may comprise using a fuel inerting system as described above in relation to any of the embodiments of the first aspect. The method may comprise providing means for or arranging the fuel inerting system to carry out any and all of the features described in relation to the first aspect.

References to upstream and downstream are intended to reference the flow direction of fuel and/or other fluids during use of the system. References to the features of the system performing actions may be understood as meaning that the system is arranged in use so as to perform those actions.

BRIEF DESCRIPTION OF THE DRAWINGS

Exemplary embodiments of the invention will now be described by way of example only and with reference to the accompanying figures, in which.

DETAILED DESCRIPTION

Figure 1:
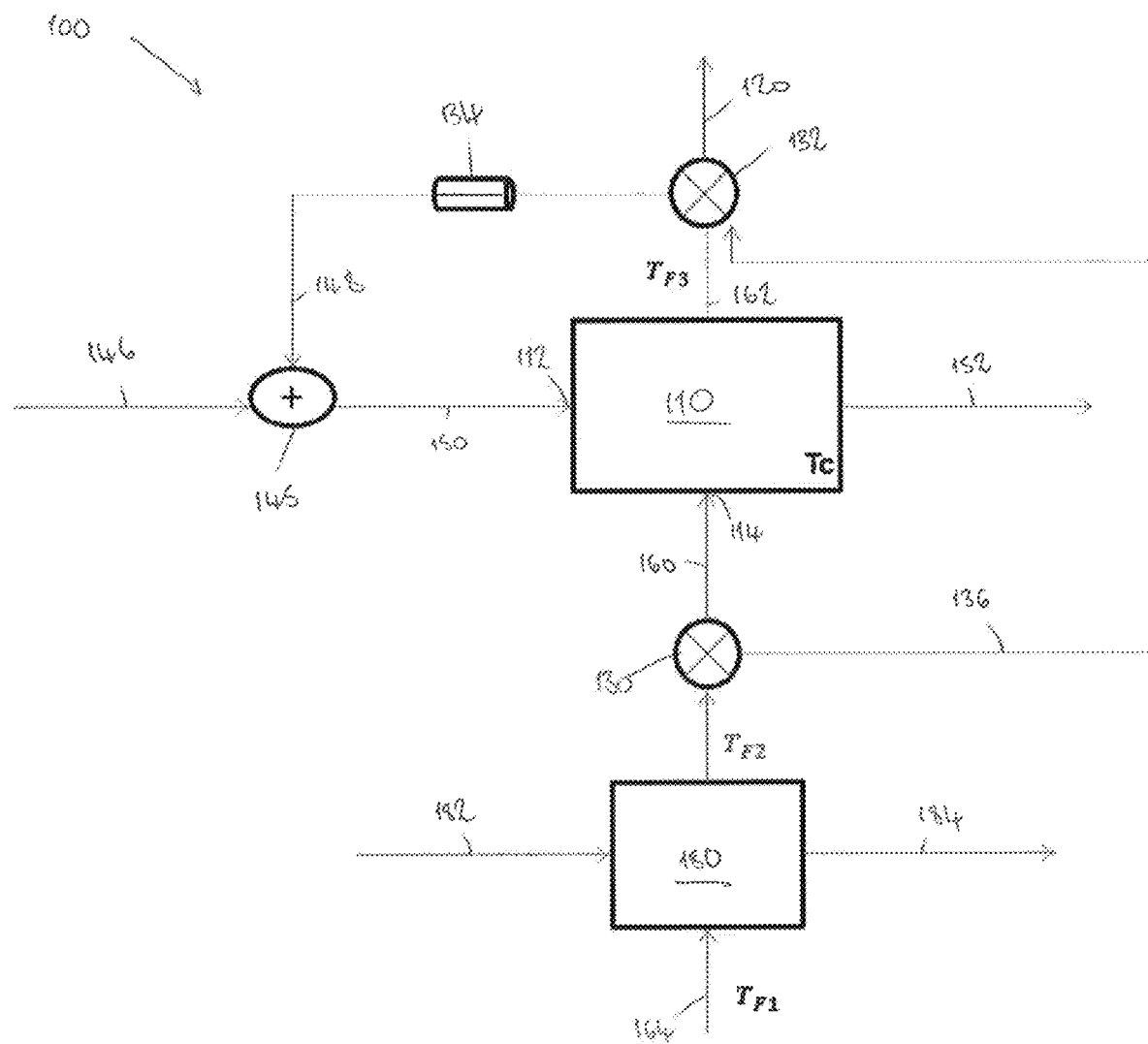
FIG. 1 shows a fuel tank inerting system comprising a catalytic heat exchanger and transfer pipe.

FIG. 1 show a fuel inerting system 100 comprising a catalytic heat exchanger 110 comprising a first and second flow path. A first inlet 112 is arranged upstream of the first flow path, and a second inlet 114 is arranged upstream of the second flow path. Fuel vapour and oxygen flow along line 150 into the catalytic heat exchanger 110, through the first inlet 112 and into the first flow path. A transfer pipe 120 is arranged to receive fuel from the second flow path.

A catalyst is disposed in the first flow path and during use the fuel and oxygen flowing into the first flow path undergo a catalysed reaction to create water and carbon dioxide. The water and carbon dioxide flows out of the first flow path via line 152, and is supplied to the ullage of a fuel tank. The catalyst has a temperature Tc.

During use, fuel flows from line 160 though the second inlet 114 into the second flow path of the heat exchanger 110. In the second flow path the fuel is in heat exchange with the first flow path and thus affects the temperature of the catalyst and catalysed reaction. The fuel is heated in the second flow path and exits the heat exchanger through line 162. Fuel entering the second flow path is at a temperature $T_{F2}$, and fuel exiting the second flow path is at a temperature $T_{F3}$.

A line 146 supplies oxygen rich air and combines with a flow of fuel vapour from another line 148 at junction 145 in order to supply a mixture of fuel and oxygen for the catalysed reaction. The ratio of flows of oxygen and fuel vapour at junction 145 may be controlled to provide the desired mixture to the heat exchanger.

A fuel conditioner 180 is disposed upstream of the second inlet 114 and is arranged to provide fuel thereto via the line 160. The fuel conditioner is arranged to receive fuel from a line 164 and pass that fuel into heat exchange with oil flowing from line 182 to 184. Fuel entering the fuel conditioner is at a temperature $T_{F1}$, and the fuel leaving the fuel conditioner is at a temperature $T_{F2}$. Thus, temperature controlled fuel is provided to the second flow path of the catalytic heat exchanger via line 160 and second inlet 114.

A temperature controlled valve 130 is disposed in line 160 and controls the flow of fuel therethrough, thereby controlling the flow of temperature controlled fuel to the second flow path and hence controlling the cooling of the catalytic reaction.

The line 162 of fuel leaving the second flow path of the heat exchanger 110 is arranged to pass fuel to line 148 via a valve 132 for supplying fuel vapour to the first inlet 112. Fuel leaving the second flow path during use is heated to a temperature $T_{F3}$ and may be vapourised or partially vapourised. This fuel vapour may then be combined with oxygen rich air at junction 145 and supplied to the first inlet 112 for feeding the catalytic reaction. A heating element 134 is provided on line 148 and is used as necessary to convert liquid fuel to fuel vapour.

The valve 132 also controls the flow of fuel to the transfer line 120. The transfer line then receives fuel from the second flow path and supplies it to the fuel tank for heat exchange. The valve 132 may be controlled as needed to apportion fuel flow, and the control may be based on fuel requirements throughout the system including the rate of fuel passing through the second flow path, the amount of fuel needed by the catalytic reaction, the temperature of the fuel tank, and the amount of fuel bypassing the second flow path via the temperature controlled valve 130.

A bypass line 136 is disposed to receive a bypass flow of fuel from the temperature controlled valve 130. The temperature controlled valve is controlled based upon the temperature of the catalyst and is configured to bypass fuel from the second flow path as necessary to achieve the desired temperature in the heat exchanger. Bypassed fuel is combined with the flow exiting the second flow path and at valve 132. The valve apportions fuel flow as required. The heating element 134 may vapourise the recombined fuel if it is passed to line 148, or the recombined fuel from the bypass may be passed to the transfer line 120. Valve 132 therefore allows for the correct fuel quantity for vapourising and supply to the first flow path. Unwanted fuel is passed to the transfer line 120.

Figure 2:
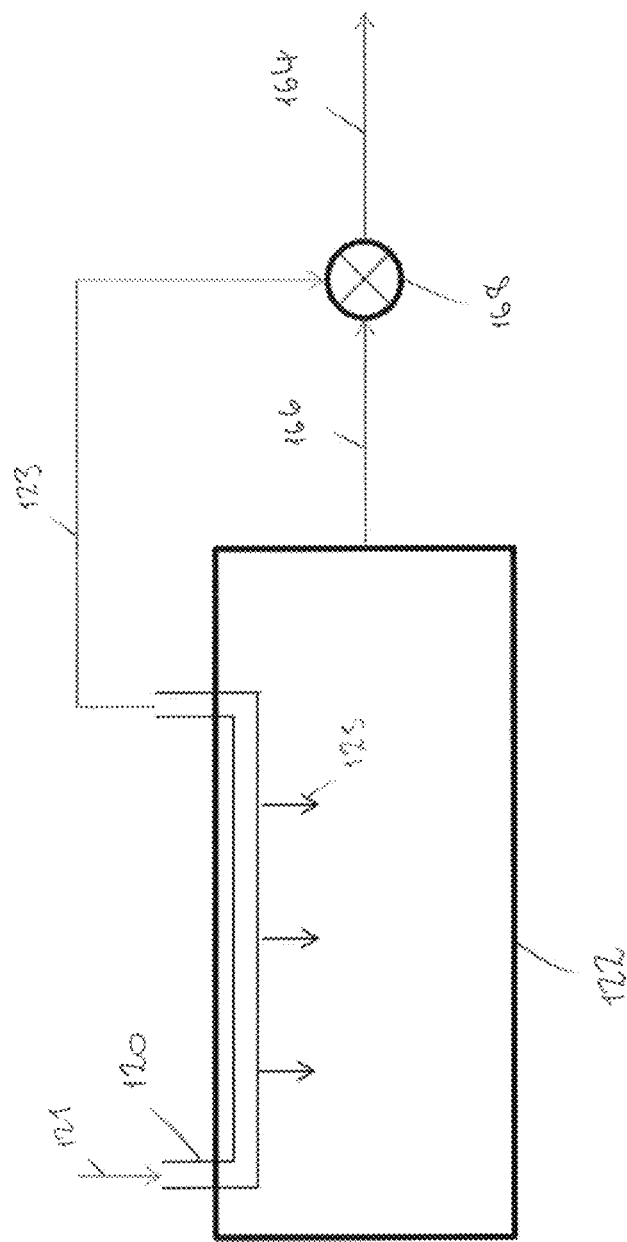
FIG. 2 shows a transfer pipe in heat exchange with a fuel tank.

FIG. 2 shows the transfer line 120 in heat exchange with the fuel tank 122. Fuel from the valve 132 and second flow path enters the transfer pipe 120 as shown schematically by arrow 121. A portion of the transfer pipe 120 is disposed within the fuel tank 122 and is in heat exchange relationship with the fuel therein. Heat 125 is therefore supplied to the fuel in the fuel tank 122. The fuel in the transfer pipe continues out of the fuel tank 122 as shown by arrow 123 and is received at valve 168 which then supplies it to line 164 for supply to the fuel conditioner 180. A line 166 supplies fuel from the fuel tank to valve 168 also for supplying the fuel conditioner 180.

The fuel inerting system 100 may therefore be used to control the temperature of the catalytic reaction. The heat necessary for forming the fuel vapour for the reaction is generated from the cooling of the reaction, thereby improving efficiency of the system. Excess heated fuel not required for the catalytic reaction may be supplied to heat the fuel tank. The preferred conditions for the system may therefore be maintained. Valves 130, 132, and 168 can be controlled by a single controller (not shown) which can account for system conditions and temperatures and control the fuel flow throughout the system as need to maintain preferred operation.

The invention claimed is:

1. A fuel tank inerting system for an aircraft, the system comprising:
    a fuel tank;
    a catalytic heat exchanger comprising a first flow path and a second flow path for heat exchange with the first flow path;
    a first inlet arranged upstream of the first flow path of the catalytic heat exchanger for providing a mixture of fuel vapour and oxygen to the first flow path for sustaining a catalysed reaction;
    a second inlet arranged upstream of the second flow path for providing a flow of liquid fuel from the fuel tank to the second flow path of the catalytic heat exchanger for exchanging heat with the first flow path; and
    a transfer pipe in heat exchange with the fuel tank through a wall of the transfer pipe, wherein the transfer pipe is arranged to receive fuel from the second flow path of the catalytic heat exchanger.

2. A fuel tank inerting system as claimed in claim 1, comprising a temperature controlled valve upstream of the second inlet for controlling the rate of flow of fuel to the second inlet.

3. A fuel tank inerting system as claimed in claim 2, wherein the temperature controlled valve is arranged to divert fuel so as to bypass the catalytic heat exchanger.

4. A fuel tank inerting system as claimed in claim 1, wherein the system is arranged to supply fuel to the first flow path from the second flow path.

5. A fuel tank inerting system as claimed in claim 1, comprising a control valve to control flow of fuel to the transfer pipe.

6. A fuel tank inerting system as claimed claim 1, wherein the transfer pipe is arrange to supply fuel back to the secondary flow path.

7. A fuel tank inerting system as claimed in claim 1, comprising a fuel conditioner upstream of the second inlet for controlling the temperature of the fuel entering the second flow path of the catalytic heat exchanger.

8. A fuel tank inerting system as claimed in claim 7, wherein the fuel tank supplies fuel to the fuel conditioner.

9. A fuel tank inerting system as claimed in claim 1, wherein a portion of the transfer pipe is disposed within the fuel tank.

* * * * *